Jan. 5, 1943.  I. E. ELM  2,307,029

RECIPROCAL POSITION INDICATOR AND TELEVISOR FOR VESSELS

Filed Nov. 12, 1940  2 Sheets-Sheet 2

INVENTOR
IENAR E. ELM.
BY Munn, Anderson & Liddy
ATTORNEYS

Patented Jan. 5, 1943

2,307,029

UNITED STATES PATENT OFFICE 2,307,029

RECIPROCAL POSITION INDICATOR AND TELEVISOR FOR VESSELS

Ienar E. Elm, Piedmont, Calif.

Application November 12, 1940, Serial No. 365,204

9 Claims. (Cl. 250—11)

The present invention relates to improvements in a reciprocal position indicator and televisor for vessels, and it consists of the combinations, constructions and arrangements hereinafter described and claimed, and also in the method of indicating the relative positions of vessels or other crafts.

An object of my invention is to provide a reciprocal position indicator and televisor for vessels that not only has novel means in one vessel for continuously indicating the position and course of the vessel on a continuously oriented map or chart, but also has novel means for televising a picture of similar equipment from another vessel to the first vessel, whereby the navigator may compare the relative positions of the two vessels on the maps.

I make use of self-synchronizing motors as connections between the rotatable loops and the direction-indicating arms, which are swingable over the surface of the map or chart. This construction is an improvement over the flexible cable connections disclosed in my copending application on an Automatic continuous geographic position indicator, Serial No. 273,938, filed May 16, 1939.

In the present invention, I also rotatably mount the map or chart on a frame that differs from the one illustrated in my copending application on a Continuously oriented map with position-indicating means, Serial No. 322,438, filed March 6, 1940. The picture-taking mechanism shown in a third copending application on a Permanent geographic route recorder, Serial No. 328,050, filed April 5, 1940, is also incorporated in the present disclosure.

Other objects and advantages will appear as the specification proceeds, and the novel features will be particularly set forth in the claims hereunto appended.

Figure 1:
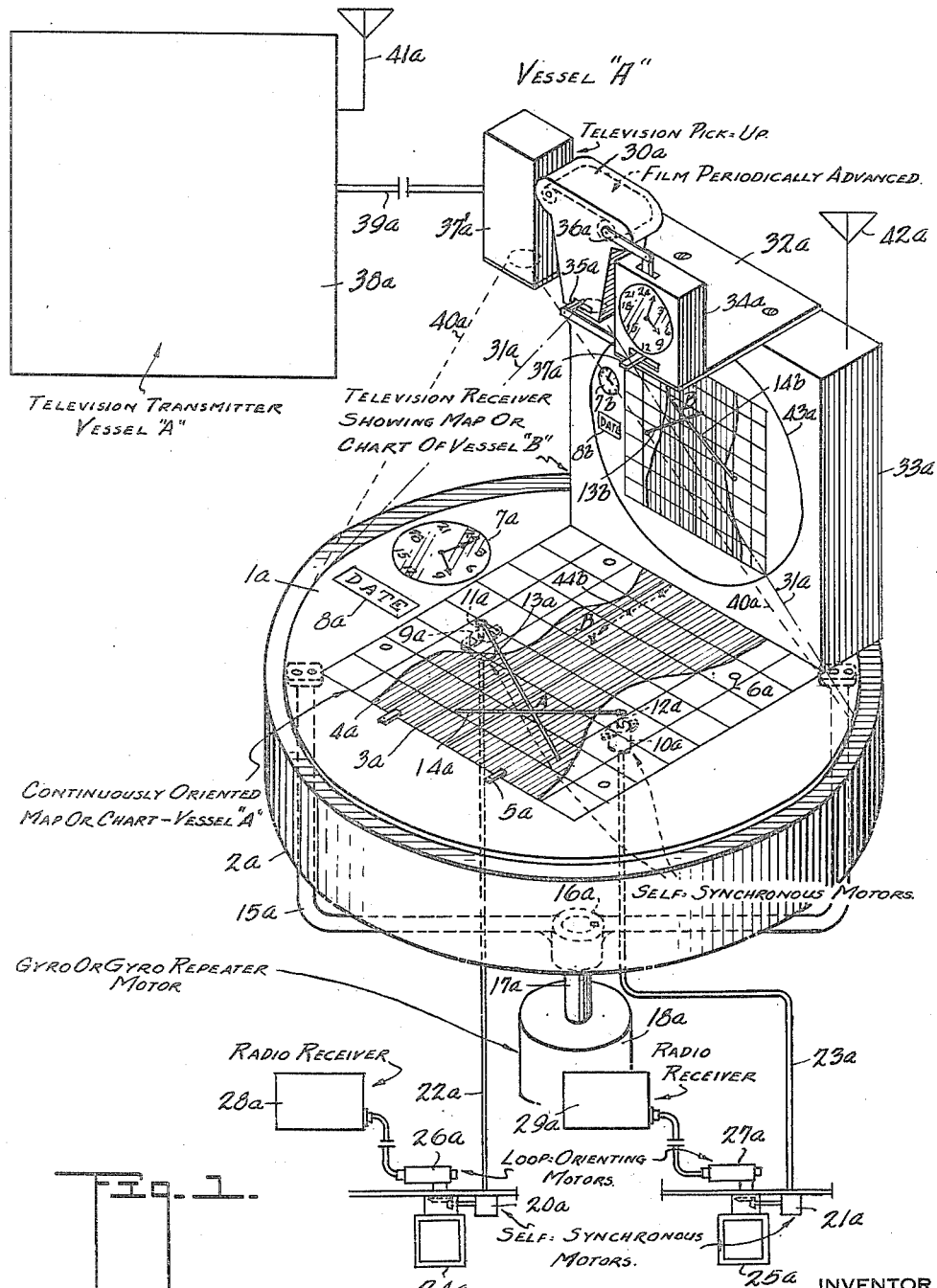
Figure 2:
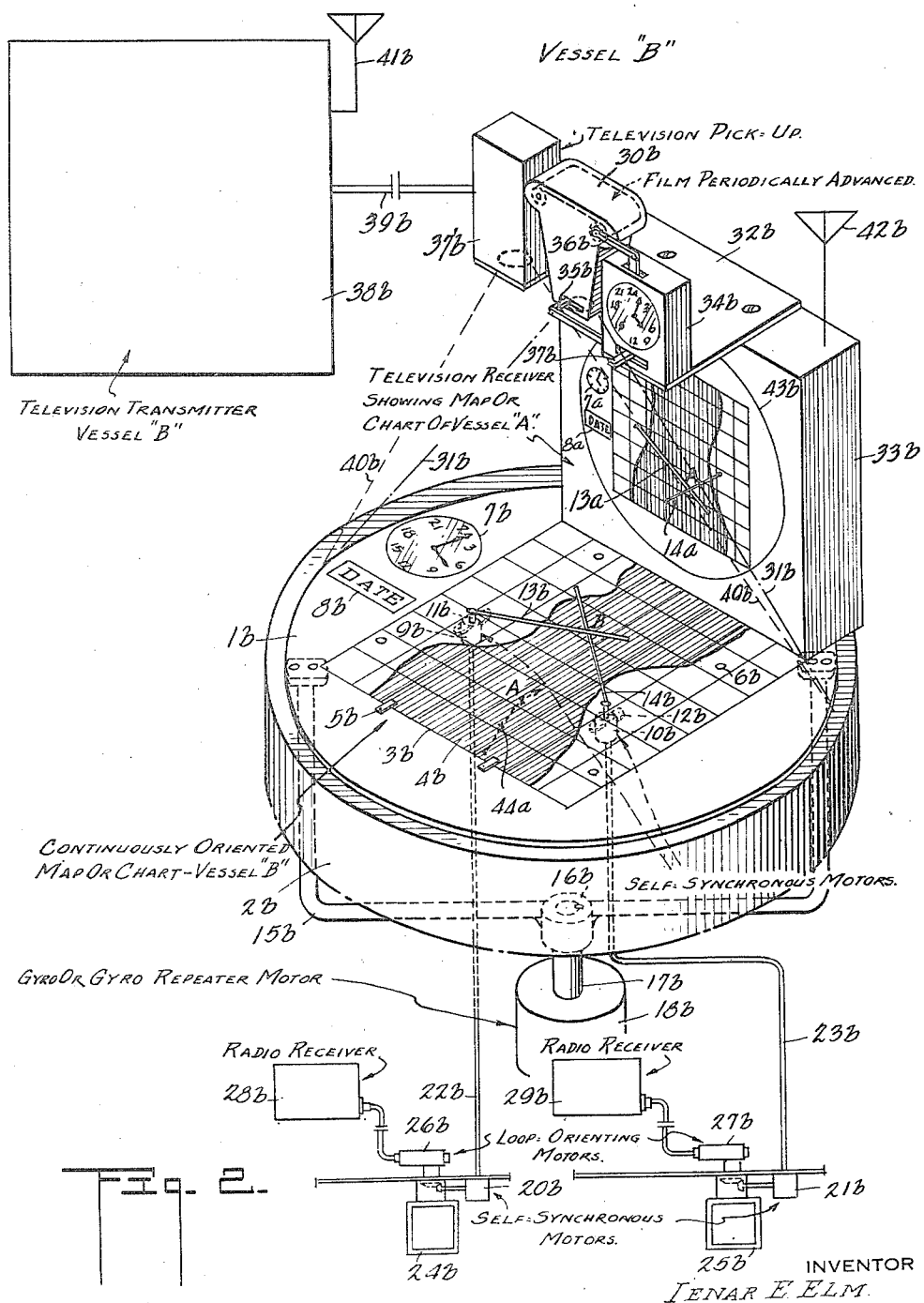

My invention is illustrated in the accompanying drawings, forming part of this application, in which:

Figure 1 is a schematic view of the apparatus used on one vessel, which I have designated as "vessel A" for the purpose of description; and Figure 2 is a similar schematic showing of the apparatus employed on a second vessel, which has been designated as "vessel B" for easy reference.

While I have shown only the preferred form of my invention, it should be understood that various changes or modifications may be made within the scope of the appended claims without departing from the spirit of the invention.

In carrying out my invention, I will describe the mechanism disclosed in Figure 1 and use the letter "a" after each reference numeral, since the mechanism will be used on "vessel A." Corresponding parts in Figure 2 will be given like reference numerals, but the letter "b" will follow each numeral, inasmuch as the mechanism shown therein is employed on "vessel B." The mechanisms illustrated in Figures 1 and 2 are identical and, therefore, a description of one will suffice for both.

The word "vessel" as used herein is a generic term and includes any type of vehicle or craft that is movable over the ground, in the air, and on or under the water. It should be clearly understood that I do not wish to be limited in this connection.

I provide a chart or map and I make use of means for continuously orienting the map or chart. In the drawings, I show one mechanism for accomplishing this orientation, although I do not desire to be confined to the exact structure shown. A turntable $la$ is rotatably mounted on the top of a frame $2a$, which may be of any shape desired. The turntable has an opening $3a$ for removably receiving a map or chart $4a$. The map may be secured in the turntable in the manner disclosed in my copending application, Serial No. 273,938, and clips $5a$, or other suitable fastening means, are used for holding the map in place.

The map or chart has the necessary data thereon for depicting the territory over which the vessel A is passing. Openings $6a$ are provided in the map and designate the exact locations of stations which are sources of radiant energy. A twenty-four hour clock $7a$ is arranged along one side of the map, or otherwise conveniently located, and is carried by the turntable $la$. A date-indicating section $8a$ is placed near the clock and will give the day, month and year.

Self-synchronizing motors $9a$ and $10a$ are removably secured to the underside of the map $4a$ and have their shafts $11a$ and $12a$, respectively, extending through two of the openings $6a$. In order to move the motors to the desired openings, the clips $5a$ may be turned to release the map and the latter raised to permit access to the underside thereof so that the motors may be moved from place to place. Any other arrangement for permitting the motors to be moved to the desired positions may be resorted to without departing from the spirit and scope of my invention. One type of self-synchronizing motor is known as the "Selsyns" motor.

Direction-indicating arms $13a$ and $14a$ are removably secured to the motor drive shafts 11a and 12a, respectively, and the connection is such as to prevent 180° ambiguity. One such form of connection is illustrated in my copending application, Serial No. 273,938.

The arms 13a and 14a may be made of flexible material and are designed to cross each other and indicate the position of the vessel on the map at their intersection. The arms move continuously with the progress of the vessel by a means hereinafter described and will continuously indicate the correct position of the vessel with relation to the map.

Before describing the means for automatically and continuously swinging the arms as the vessel moves, it is best to briefly describe the mechanism for continuously keeping the map oriented. In my second copending application, Serial No. 322,438, I disclose the map frame operatively connected to a gyro or gyro repeater. In this way the map is kept continuously oriented. As already stated, any means for continuously orienting the map or chart may be used. I have illustrated a spider 15a that has angle-shaped arms, the ends of which are connected to the turntable 1a. The spider 15a has a hub portion 16a keyed to a shaft 17a that projects from a gyro or gyro repeater 18a. The gyro or gyro repeater is mounted on a fixed part of the vessel A and continuously keeps the map 4a oriented by means of the spider 15a and turntable 1a.

I will now describe the means for swinging the arms 13a and 14a. In my first copending application, Serial No. 273,938, I disclose loop orienting motors automatically turning loops so that the latter will maintain the desired angular relation with respect to the incoming radiant energy waves at all times. Flexible shafts are shown as the means for swinging the direction-indicating arms in synchrony with the loops.

The present invention makes use of pairs of self-synchronizing motors, rather than flexible shafts for connecting the arms with the loops, or other means for determining the direction from which radiant energy might emanate. Self-synchronizing motors 20a and 21a are electrically connected to the motors 9a and 10a, respectively, by wires 22a and 23a. The motors 20a and 21a are mechanically connected to loops or radiant-receiving members 24a and 25a, respectively, and to loop-orienting motors 26a and 27a, respectively.

Radio receivers, or radiant energy receivers, 28a and 29a are used to tune in the sources of radiant energy represented by the motor shafts 11a and 12a received in the openings 6a. When once the stations are tuned in, the loops will be automatically swung into a predetermined angle with the received radiant waves and, through the self-synchronous motors, will swing the arms 13a and 14a in synchrony with the loops. The arms, therefore, will continuously lie in lines that pass through the stations and the intersection of the arms will continuously indicate the location of the vessel on the map or chart.

As the vessel progresses over the territory depicted by the map or chart, the motors 9a and 10a are advanced from point to point represented by the openings 6a. At each new position of the motors 9a and 10a, new radiant energy source stations corresponding to the new openings 6a are tuned in by the receivers 28a and 29a.

A permanent record of the course of the vessel may be kept as it moves across the territory represented by the map or chart. The mechanism employed is the same as that disclosed in my third copending application, Serial No. 328,050. In that application, I set forth a camera permanently focused on the map or chart and turning therewith as a unit. A clock mechanism associated with the camera periodically opened the camera shutter at selected time intervals and caused the camera to take a picture. The clock then controlled the actuation of another mechanism after each picture was taken for bringing a new length of film into the proper position for the next picture. This process was then repeated for photographing the trip.

The present invention includes a camera 30a permanently focused so as to take in the entire turntable top as indicated by the broken lines 32a. The camera is secured to a support 32a, which in turn is mounted on a television receiver 33a, or other suitable support. The receiver 33a, or other support, is mounted on the turntable 1a and causes the camera to turn as a unit therewith. A twenty-four hour clock 34a is arranged alongside of the camera 30a. The clock periodically actuates a shutter arm 35a and a film-moving arm 36a, the latter being made to periodically advance the film in the camera as indicated by the legend on the drawings.

A regulator shown at 37a is used for controlling the period of time between operations of the camera shutter. The camera, therefore, will take successive pictures of the map or chart, which will show the position-indicating means, the time and date.

The principal feature of the present invention resides in the televising of the map or chart and course indicator from the vessel A to the vessel B, and vice versa. A television pick-up is indicated diagrammatically at 37′a and is electrically connected to a television transmitter 38a in the usual way by an electrical conduit 39a. The television pick-up turns as a unit with the turntable 1a and covers the entire surface of the turntable as indicated by the dotted lines 40a. An aerial 41a leading from the television transmitter transmits the waves so that the aerial 42b on the vessel B will cause a picture of the map or chart and the position indicator to be flashed on the television screen 43b. In Figure 1, the receiver aerial on the vessel A is indicated at 42a and the screen at 43a. The vessel A receives pictures from the vessel B.

From the foregoing description of the various parts of the apparatus, the operation thereof may be readily understood. The vessel A is equipped with all of the mechanism illustrated in Figure 1, and the vessel B has a similar arrangement shown in Figure 2. A similar map 4a and 4b is disclosed in each view, but this is not essential. It is necessary, however, that a portion of one map or chart be the same as that of the other so that a comparison may be made between the positions of the two vessels and the courses they are traveling.

The screen 43a is placed at the north side of the map 4a and stands in a vertical position with respect to the map or chart so that the navigator will be able to easily compare both as the turntable is being continuous oriented. In vessel A, the arms 13a and 14a will continuously give the correct position of that vessel on its map or chart. At the same time, the screen 43a will be showing the televised pictures of the map 4b and arms 13b and 14b, together with the clock 7b and date 8b of the vessel B. The navigator may plot the course being taken by the vessel B by placing marks 44b on the map 4a. In a like manner, the navigator of vessel B may plot the course taken by the vessel A and place the marks 44a on his chart or map 4b.

I claim:

1. In combination, a continuously oriented map, direction-indicating means continuously movable across the face of the map for indicating the course of a vessel on the map, a television receiver movable as a unit with the map, a second continuously oriented map on a second vessel, a second direction-indicating means continuously movable across the face of the second map for indicating the course of the second vessel on the second map, and a television transmitter in the second vessel for sending pictures of the second map and the position-indicating means on the latter to the television receiver on the first vessel.

2. In combination, a continuously oriented map, direction-indicating means continuously movable across the face of the map for indicating the course of a vessel on the map, a television receiver on the first vessel, a second continuously oriented map on a second vessel, a second direction-indicating means continuously movable across the face of the second vessel map for indicating the course of the second vessel on the second map, and a television transmitter in the second vessel for sending pictures of the second map and the position-indicating means on the latter to the television receiver on the first vessel.

3. In combination, a continuously oriented map having areas designated thereon, a direction-indicating means continuously movable across the face of the map for indicating the course of a vessel on the map, a television receiver on the first vessel, a second continuously oriented map on a second vessel having at least some areas designated thereon which correspond to certain areas on the first map, a second direction-indicating means continuously movable across the face of the second map for indicating the course of the second vessel on the second map, and a television transmitter on the second vessel for sending pictures of the second map and the position-indicating means on the latter to the television receiver on the first vessel.

4. In combination, a rotatable map, a gyro operated means operatively connected to the map for continuously orienting the latter, direction-indicating means continuously movable across the face of the map for indicating the course of a vessel, a television receiver on the first vessel, a second rotatable map on a second vessel, a second gyro operated means operatively connected to the second map for continuously orienting the latter, a second direction-indicating means continuously movable across the face of the second map for indicating the course of the second vessel, and a television transmitter in the second vessel for sending pictures of the second map and the direction-indicating means on the latter to the television receiver on the first vessel.

5. In combination, a continuously oriented map, direction-indicating means continuously movable across the face of the map for indicating the course of a vessel on the map, a television receiver on the first vessel mounted in a predetermined position with respect to the map in the first vessel and being movable with the latter so as to maintain said position at all times, the television receiver having a screen disposed for clear view of a navigator viewing said map, a second continuously oriented map on a second vessel, a second direction-indicating means continuously movable across the face of the second vessel map for indicating the course of the second vessel on the second map, and a television transmitter in the second vessel for sending pictures of the second map and the position-indicating means on the latter to the television receiver on the first vessel for display on the screen thereof.

6. The herein described method of indicating the relative positions of two vessels and the courses they are taking, which consists in indicating within a visual area the position and direction being pursued by one of the vessels, indicating on a second similar area the position and direction being pursued by the second vessel, creating a third visual area near the first and similar to the second so that a person can watch both the first and third areas, and in televising on the third area the position and direction being pursued by the second vessel in the second area.

7. In combination, an area with defined limits, direction indicating means movable across the area for indicating the course of a movable object on the area, a television receiver with a screen in a position to be viewable by a person who can also view the area, a second area with defined limits, a second direction-indicating means movable across the second area for indicating the course of a second movable object on the second area, and a television transmitter associated with the second area for sending pictures of the second area and the position-indicating means on the latter to the screen of the television receiver.

8. In combination, a map, direction-indicating means movable across the face of the map for indicating the course of a vessel on the map, a television receiver on the first vessel, a second map on a second vessel, a second direction-indicating means movable across the face of the second vessel map for indicating the course of the second vessel on the second map, and a television transmitter in the second vessel for sending pictures of the second map and the position-indicating means on the latter to the television receiver on the first vessel.

IENAR E. ELM.